United States Patent [19]

Azok

[11] Patent Number: 5,352,244
[45] Date of Patent: Oct. 4, 1994

[54] PROCESS FOR TRACING LIQUID FLOW WITH A DYE-IMPREGNATED PAPER STRIP

[75] Inventor: Franklin D. Azok, Amherst, Ohio

[73] Assignee: Norlab, Inc., Lorain, Ohio

[21] Appl. No.: 943,404

[22] Filed: Sep. 2, 1992

[51] Int. Cl.5 .......................... C09B 67/02; D06P 5/00
[52] U.S. Cl. ............................................ 8/506; 8/526; 8/919; 252/408.1; 252/964
[58] Field of Search ............................. 8/526, 506, 919; 252/408.1, 964

[56] References Cited

U.S. PATENT DOCUMENTS

| | | | |
|---|---|---|---|
| 302,544 | 7/1984 | Conant | 8/526 |
| 384,804 | 6/1988 | Weiss | 8/526 |
| 399,974 | 3/1889 | Conklin | 206/0.5 |
| 1,279,679 | 9/1918 | Fear | 8/526 |
| 2,418,392 | 4/1947 | Bender | 206/0.5 |
| 3,048,464 | 8/1962 | Fisher | 8/526 |
| 4,010,497 | 3/1977 | Menter et al. | 4/1 |
| 4,046,507 | 9/1977 | Zweifel et al. | 8/526 |
| 4,080,677 | 3/1978 | Koehler | 441/80 |
| 5,130,290 | 7/1992 | Tanimoto | 503/201 |
| 5,250,708 | 10/1993 | Barry, Jr. | 549/226 |

FOREIGN PATENT DOCUMENTS

| | | |
|---|---|---|
| 802512 | 2/1951 | Fed. Rep. of Germany . |
| 185371 | 1/1988 | Japan . |
| 9113207 | 9/1991 | World Int. Prop. O. . |

*Primary Examiner*—Paul Lieberman
*Assistant Examiner*—Caroline L. Dusheck
*Attorney, Agent, or Firm*—Fay, Sharpe, Beall, Fagan, Minnich & McKee

[57] ABSTRACT

A dye strip for tracing liquid flow comprises a water-soluble paper impregnated with tracing dye. The dye-impregnated paper is in a dry form prior to use. A process for preparing the biodegradable dye strip calls for providing a water-soluble paper, communicating the water-soluble paper with liquid dye to absorb said liquid dye into the paper and forming a resulting dye-impregnated paper. The resulting dye-impregnated paper is dried. The product can be placed into a vat containing liquid. Dye diffuses from the paper into the liquid to form dyed liquid. The flow of the dyed liquid is then observed.

8 Claims, 1 Drawing Sheet

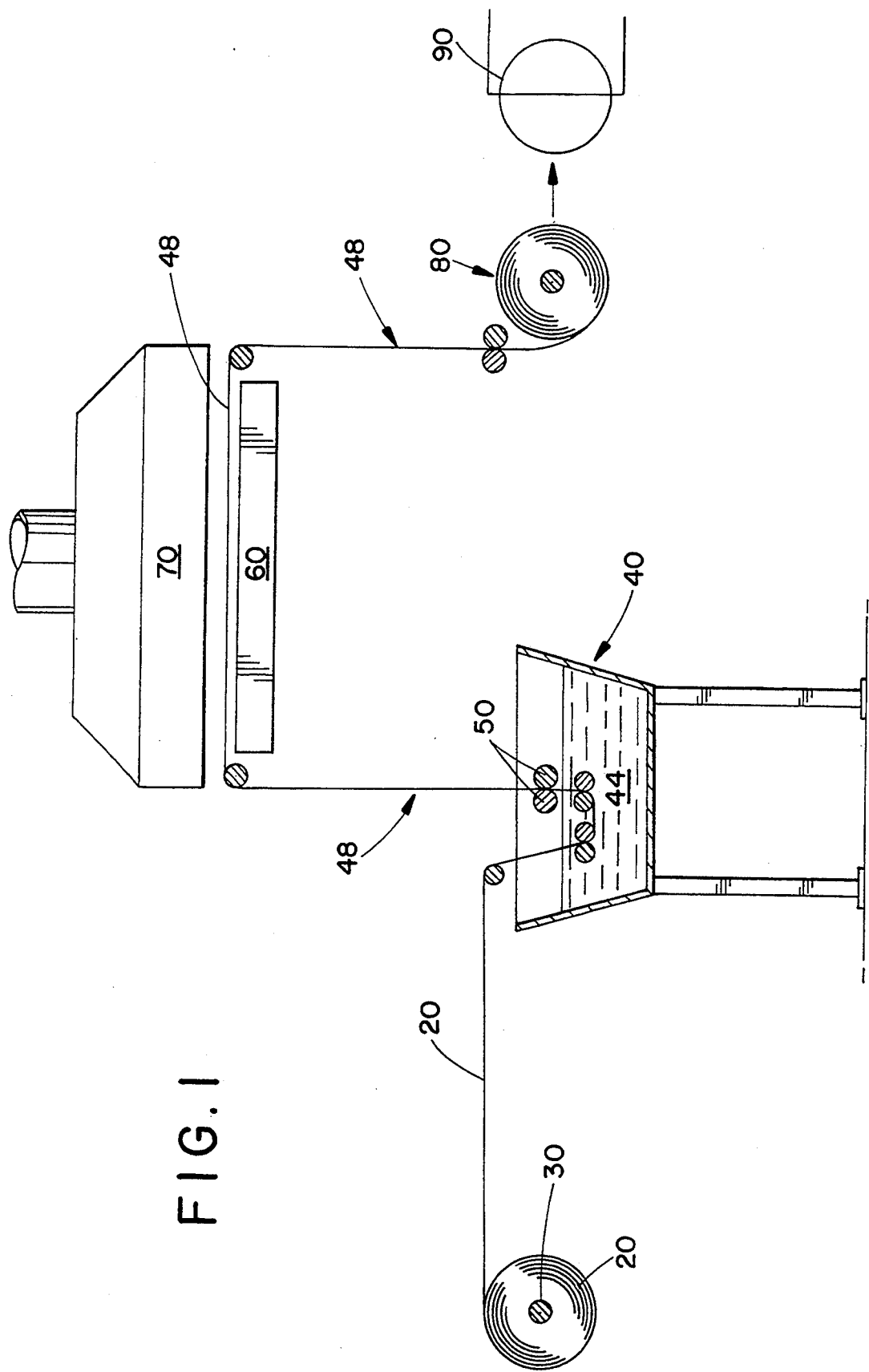

PROCESS FOR TRACING LIQUID FLOW WITH A DYE-IMPREGNATED PAPER STRIP

BACKGROUND OF THE INVENTION

This invention relates to the art of dyes used for tracing or observing liquid flow. In particular, the present invention is directed to a new tracing dye product, a process for making the tracing dye product, as well as a method of tracing liquid flow using the tracing dye product.

The tracing dye product described herein is applicable to detecting leaks in a variety of liquid-containing vessels including toilets, lateral piping, drainage tile, sewers and downspouts; or locating connection points in systems such as sewers. It can also be used in connection with situations such as septic system analysis, detection of water movement, and flow time studies. It will be appreciated that the invention encompasses a broad range of uses and may be advantageously employed in environments and applications not mentioned herein.

Tracing dyes have been used for years as a tool for observing liquid flow to detect leaks or to study water movement. Common users of such tracing dyes include, but are not limited to, city sewer departments, wastewater treatment plants, and various county boards of health and environmental departments. Tracing dyes are also used in the private sector. For example, homeowners are likely to use dyes to detect leaks in residential plumbing systems.

Existing tracing dyes are available in a variety of forms. These forms include dry powders, concentrated liquids, tablets, blocks and cones comprising solid pressed dry powder.

There are problems that exist for each of the above-mentioned existing forms of tracing dye. For instance, each of the existing forms is messy to use. Not only do the dyes typically escape to other surfaces, but they often call for the use of various vessels for transferring the dyes to the liquid to be tested. In addition, the preexisting tracing dyes are oftentimes bulky. As a result, they are generally ineffective without use in connection with an adequate amount of water or liquid. Also, preexisting liquid dyes freeze at low temperatures. Finally, many of the preexisting dyes are difficult to transport or carry about by the user.

The present invention contemplates a new and improved tracing dye and method which overcomes all of the above referenced problems and others. The new invention provides a tracing dye format which is clean, simple to use, easily transported and effective in a relatively small amount of water or liquid.

BRIEF DESCRIPTION OF THE INVENTION

In accordance with the present invention, there is provided a dye-impregnated paper which can be used as a tracing dye in water or other liquid systems.

In accordance with a more limited aspect of the invention, a dye strip for tracing liquid flow comprises a water-soluble biodegradable paper impregnated with tracing dye. The dye-impregnated paper is in a dry form prior to use.

The water-soluble biodegradable dye strip is prepared by absorbing liquid dye into the dye strip and then drying the resulting dye-impregnated paper.

The dye-impregnated water-soluble paper can be placed in a vessel that contains liquid that is flowing or at rest. The dye diffuses into the liquid to form a dyed liquid. The flow of the dyed liquid can then be observed.

A principal advantage of the invention is that the medium which transports the dye into the water is biodegradable and water-soluble. Hence it will not harm the environment or block plumbing facilities. The dyes, too, are water-soluble and non-toxic and are used in such small amounts that they will not adversely affect the environment. Consequently, the resulting dye strip product is non-hazardous and non-toxic.

Another advantage of the invention is that the resulting dye strip product is neat, self-contained and simple to use.

Still other advantages and benefits of the invention will become apparent to those skilled in the art upon a reading and understanding of the following detailed description.

BRIEF DESCRIPTION OF DRAWINGS

The invention may take physical form in certain parts and arrangements of parts, a preferred embodiment of which will be described in detail in this specification and illustrated in the accompanying drawing which forms a part hereof.

FIG. 1 is a schematic representation of a process for forming a dye product in accordance with the present invention.

DETAILED DESCRIPTION OF THE PREFERRED EMBODIMENT

Referring now to the drawing wherein the showings are for purposes of illustrating the preferred embodiment of the invention and not for purposes of limiting same, attention is directed to FIG. 1 which shows a schematic representation of a continuous process for forming the dye product of the present invention.

A roll of dry form paper 20 having a width of about sixty inches (60") and wound on a spool 30 is slowly and continuously fed to a vessel or vat 40 containing liquid tracing dye 44. The paper is gradually unwound from the spool and submerged into the tracing dye. Liquid tracing dye present in vat 40 is absorbed and impregnated into the dry form paper. Dye-impregnated paper 48 is continuously passed through wringers 50 and then across a drying platform 60 where a gas heat dryer 70 dries the liquid dye. The paper product does not wrinkle, shrink or lose its shape or form upon drying.

Once the continuous dye strip has been dried, it is transferred to another roll 80. Thereafter, the resulting dyed dry strip in rolled form is sent to slicing mechanism 90 and sliced to approximately four inch (4") widths. The four inch wide strips are then cut to desirable sizes, typically around two and one half by four (2½×4) inches. Separate 2½×4" dye strips are individually wrapped in clear plastic for unit dosage. As such many of the undesirable features of liquid tracing dyes of the prior art are eliminated. There is no bulk, no messy transfer and no chance for the dyes to escape to other surfaces.

The dry form paper used in preparing the dye strip is a soft lightweight weave embossed fabric comprising bleached pulp and latex binder. The paper is water-soluble and biodegradable. The paper has the following characteristics:

| | |
|---|---|
| Basis weight, lb/3000 ft² FH-DF-1c | 35.0 |
| Thickness (8 ply), .001 inches FH-DF-2c | 169 |
| Dry Tensile, g/in MD FH-DF-4c-1 CD | 945 765 |
| Wet Tensile, g/in. MD FH-DF-5c-1 CD | 550 445 |
| Absorbent Capacity, XOW FH-DF-9c | 11.4 |
| Absorbency Rate, seconds FH-DF-7c | 3.5 |
| Brightness, % FH-DF-10c | 83.4 |

An important feature of the paper used in the present invention is that it can be fully saturated with liquid tracing dye. Then, during the drying process, the paper maintains its shape without wrinkling, warping or shrinking. The end result is a paper product uniformly impregnated with tracing dye.

The paper is biodegradable. It does not dissolve immediately upon submersion in water, but is eventually completely broken down through biological activity at or along the way to wastewater treatment plants, in septic systems or in streams or other waters. As such, the biodegradable paper can be used as a vehicle for tracing dye in sanitary sewers, storm sewers, rivers, creeks and other bodies of water. It poses no known long-term threat to the environment.

With attention once again directed to FIG. 1, a large roll of the dry form paper 20 is automatically moved via a spindle conveyer system through a flex-o-printing press. Once in the press, the roll of paper is wound over a fountain roller, which is in an anti-lock position, adding an appropriate amount of pressure to the paper such that it is properly submerged in vessel 40 and impregnated with the liquid tracing dye 44. Spool 30 of unimpregnated paper is unwound at a rate of approximately 60 feet per minute. The paper is maintained in vessel 40 quite briefly, on the order of fractions of a second. The liquid tracing dye is water-soluble, non-toxic, non-hazardous and can be used in a multitude of situations such as in the tracing of liquid flow or detecting and locating leaks.

The fountain roller is actually a wringer system 50. The paper, after having been submerged in the liquid tracing dye 44 of vat 40, is guided out of the vessel through wringers 50 which squeeze from the paper any dye in excess of saturation level of the dye strip. The impregnating step has been terminated and the paper is conveyed along. The paper reaches the rubber roll position 84. At this point, the prescribed quantity of dye has been impregnated into the paper and the paper is now carried along to the drying stage. This is the point where the forced gas heat, at the appropriate temperature, dries the dye strip without shrinking it. The temperature in the drying tunnel is in the range of about 450° F. to about 475° F. The impregnated paper passes through the dryer at a rate of about 60 feet per minute. The overall process is continuous.

The roll of paper may have a width of as much as about sixty inches (60") but is slit into multiple four inch (4") rolls. The four inch rolls are, in turn, cut into two-and-one-half by four inch ($2\frac{1}{2} \times 4"$) lengths after having been impregnated with the dye. Roughly one-third ounce of concentrated dye is impregnated into each $2\frac{1}{2} \times 4"$ dye strip.

A single dye strip can be submerged into as much as five hundred (500) gallons of water, or other aqueous solution, and be able to provide an adequate visual reading of liquid flow or leak detection upon diffusion of the dye into the liquid. Similarly, the dye strip can be used in a vessel containing a minimal amount of water (less than one gallon).

In essence, there is no precise recommended range of preferred liquid volumes for using the dye strip. The effectiveness of an individual dye strip varies with the liquid composition being tested. There are many types of liquids including water, water with added chemicals or detergents, water that is heavy with solids and various types of sewages, and water-soluble liquids which can be tested. All of these affect the performance of tracing dyes. This leads to the situation where one simply relies on trial and error to determine an appropriate number of dye strips to use for a given circumstance. Such determination will be based on a desired level of brightness in the tested liquid. In general, as stated above, one dye strip placed into five hundred gallons (500) of water will provide an adequate visual reading. Of course, as the quantity of water is reduced, the brightness of the dye dissipated in the water will increase. Similarly, an increase in the number or size of dye strips leads to an increase in brightness.

The liquid tracing dye used in preparing the dye strip is commercially available. While dyes of the xanthene and triphenylmethane dye families are recommended, others including but not limited to uranine or dipotassium fluorescein may be incorporated as well. Chemical names of dyes which can be used include, but are not limited to, acid yellow 73, acid blue 9, and acid red 388. Some of the specifications for the liquid dyes which may be used are set forth below.

| | LIQUID POWDER TRACING DYES | | |
|---|---|---|---|
| | YELLOWGREEN | RED | BLUE |
| CHEMICAL NAME | Acid yellow 73 aqueous solution | Proprietary | Acid Blue 9 aqueous solution |
| TRADENAME | Liquid powder tracing dye fluorescent yellowgreen | Liquid powder tracing die fluorescent red | Liquid powder tracing dye high intensity blue |
| CHEMICAL FAMILY | Xanthene | Xanthene | Triplenylmethane |
| FREEZING POINT | 30° F. | 30° F. | 30° F. |
| SOLUBILITY IN $H_2O$ | 100% | 100% | 100% |
| APPEARANCE | Brown | Dark Red | Dark Blue |
| SPECIFIC GRAVITY ($H_2O = 1$) | Approximately 1 | Approximately 1 | Approximately 1 |
| DECOMPOSITION PRODUCTS | Carbon Monoxide, Carbon Dioxide, Oxides of | Carbon Monoxide, Carbon Dioxide, Oxides of | Carbon Monoxide, Carbon Dioxide, Oxides of |

| LIQUID POWDER TRACING DYES | | |
|---|---|---|
| YELLOWGREEN | RED | BLUE |
| Nitrogen | Nitrogen | Nitrogen |

An example of using the dye product may be found in checking a residential commode for a leak. In this regard, a tank top is removed from a tank at the rear of a commode. A dye strip is then dropped into the tank, bursting into color immediately upon entry into the tank. If a commode is leaking, tracing dye will appear in the commode bowl within seconds.

Temperature does not affect the performance of the dye strip as long as the water, liquid or sewage being tested is not frozen.

A dye strip can be used to check the flow of liquids in municipal or other sewer lines. It is convenient to use, easy to carry about or transport, water soluble, biogradable and simple to use. The dye bursts into color immediately upon contact with water. The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

I claim:

1. A process for tracing liquid flow, comprising:
   providing a dye-impregnated paper strip comprised of:
      a dry form water-soluble biodegradable paper formed from a weave embossed fabric of bleached pulp and latex binder, said water-soluble biodegradable paper uniformly impregnated and saturated with a water-soluble non-toxic colored tracing dye selected from the group consisting of triphenylmethane and xanthene based dyes; submerging the dye-impregnated paper strip into a vessel containing an aqueous liquid therein, the aqueous liquid being above its freezing temperature;
   diffusing the colored tracing dye from the paper into the aqueous liquid to form colored aqueous liquid;
   observing the flow of the colored liquid within the vessel downstream from the paper; and
   subsequently breaking down the paper through biological activity.

2. A process for tracing liquid flow, as set forth in claim 1, including the additional step of:
   detecting a leak in the vessel by observing the flow of the dyed liquid downstream from the paper.

3. A process for tracing liquid flow, as set forth in claim 1, wherein the dye-impregnated paper strip may be submerged into a vessel to color up to 500 gallons of aqueous liquid.

4. A process for tracing liquid flow, as set forth in claim 1, wherein the aqueous liquid may comprise water or sewage.

5. A process for tracing liquid flow, as set forth in claim 1, comprising the additional step of:
   decomposing the tracing dye into carbon monoxide, carbon dioxide and oxides of nitrogen.

6. A process for tracing liquid flow, as set forth in claim 1, wherein the paper has a basis weight of about 35.0 lb/3000ft$^2$ and an 8-ply thickness of about 0.169 inches.

7. A process for tracing liquid flow, as set forth in claim 1, wherein the paper has an absorbency rate of about 3.5 seconds and a brightness level of about 83.4%.

8. A method for detecting a leak in a commode including a commode tank and a commode bowl, comprising the steps of:
   providing a dye-impregnated paper strip comprised of:
      a dry form water-soluble biodegradable paper formed from a weave embossed fabric of bleached pulp and latex binder, said water-soluble biodegradable paper uniformly impregnated and saturated with a water-soluble non-toxic colored tracing dye selected from the group consisting of triphenylmethane and xanthene based dyes;
   submerging the dye-impregnated paper strip into the commode tank;
   coloring water present in the commode tank by diffusing dye from the paper into the water;
   determining if the commode tank is leaking by observing whether dyed water appears in the commode bowl; and
   subsequently breaking down the paper through biological activity.

* * * * *